(12) United States Patent
Yarabolu

(10) Patent No.: US 12,717,907 B2
(45) Date of Patent: Aug. 25, 2026

(54) PROACTIVE ANTI CYBER-FORENSIC ACTIVITY DETECTION AND PREVENTION

(71) Applicant: Bank of America Corporation, Charlotte, NC (US)

(72) Inventor: Vijay Kumar Yarabolu, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 83 days.

(21) Appl. No.: 18/758,388

(22) Filed: Jun. 28, 2024

(65) Prior Publication Data

US 2024/0403423 A1 Dec. 5, 2024

Related U.S. Application Data

(62) Division of application No. 17/729,622, filed on Apr. 26, 2022, now Pat. No. 12,067,113.

(51) Int. Cl.
*G06F 21/55* (2013.01)

(52) U.S. Cl.
CPC ...... *G06F 21/554* (2013.01); *G06F 2221/031* (2013.01)

(58) Field of Classification Search
CPC ......................... G06F 21/554; G06F 2221/031
USPC ........................................................... 726/23
See application file for complete search history.

(56) References Cited

U.S. PATENT DOCUMENTS

| | | | |
|---|---|---|---|
| 9,690,933 B1 | 6/2017 | Singh et al. | |
| 9,912,691 B2 | 3/2018 | Mesdaq et al. | |
| 10,033,753 B1 | 7/2018 | Islam et al. | |
| 10,200,384 B1 | 2/2019 | Mushtaq et al. | |
| 11,082,441 B1 | 8/2021 | Bouguerra et al. | |
| 2020/0043115 A1 | 2/2020 | Nelson et al. | |
| 2020/0045538 A1* | 2/2020 | Dattawadkar | H04L 9/50 |
| 2020/0234816 A1 | 7/2020 | De Armas | |
| 2022/0360450 A1* | 11/2022 | Brandenburger | H04L 9/0894 |
| 2023/0109544 A1* | 4/2023 | Fletcher | H04L 9/3239 713/168 |
| 2024/0070674 A1 | 2/2024 | Bora et al. | |

FOREIGN PATENT DOCUMENTS

CN 107888607 B 11/2020

* cited by examiner

*Primary Examiner* — Jacob Lipman
(74) *Attorney, Agent, or Firm* — Banner & Witcoff, Ltd.

(57) ABSTRACT

Computer-implemented cyber-security processes and machines provide proactive anti-forensics activity detection and prevention to safeguard the integrity of transactions and their associated log details or other data using artificial intelligence and/or machine learning, thereby ensuring that all transactions and logs within the system are complaint for cyber forensics, and helping to make reactive forensic tasks more robust by adding proactive monitoring and compliance activity.

7 Claims, 6 Drawing Sheets

Structured Data - 200

| Non-Personal Column #1 201-1 | Non-Personal Column(s) | Non-Personal Column #N 201-N | Column for Social Security No. 203 |
|---|---|---|---|
| Metadata in Heading for Column #1 202-1 | Metadata in Heading for Column(s) ... | Metadata in Heading for Column #N 202-N | Metadata in Heading for Social Security No. 204 |
| Value - A | Value - D | Value - G | SS No. 204-1 |
| Value - B | Value - E | Value - H | SS No. 204-2 |
| Value - C | Value - F | Value - I | SS No. 204-3 |

FIG. 2

Validating Compliance Hash

PROACTIVE ANTI CYBER-FORENSIC ACTIVITY DETECTION AND PREVENTION

CROSS REFERENCE TO RELATED APPLICATION(S)

This application is a divisional of and claims priority to U.S. patent application Ser. No. 17/729,622 entitled "Proactive Anti Cyber-Forensic Activity Detection and Prevention" filed Apr. 26, 2022 which is incorporated by reference in its entirety.

TECHNICAL FIELD OF DISCLOSURE

The present disclosure relates to processes and machines for information security including the prevention and detection of unauthorized data modification with respect to falsification or theft of data and alteration of data inconsistent with defined security policies to control data tampering by limiting access to authorized entities or processes for general access control or authentication of information security.

BACKGROUND

Cyber forensics refers to investigating, gathering, and analyzing information from a computer device to investigate fraud committed in a system or on a network.

Unlawful activity that contravenes governing rules for the system or network can be unintentional (such as by accident) or intentionally perpetrated (such as by a hacker). If an incident occurs accidentally, it is likely that evidence relating to the violation may be available and discoverable within the system using traditional cyber forensic tools.

However, in the event of intentional violations, perpetrators often attempt to conceal or wipe-out all evidence of the crime. For example, in polymorphic artificially-intelligent-powered virus attacks, a virus can commit fraud and learn to remove some or all evidence or traces of the illegal activity to escape detection. By the time a forensic investigator learns of a potential breach and initiates an investigation, some or all valuable evidence has often been altered or erased from the system by the hacker.

Hence there is a long felt and unsatisfied need in the field of cyber security to proactively monitor and preserve evidence of computer activity and transactions to improve forensic investigations and preferably prevent crimes as well as prevent attempts at their concealment.

SUMMARY

In accordance with one or more arrangements of the disclosures contained herein, solution(s) are provided to address one or more of the shortcomings in the cyber security industry by, inter alia, providing proactive anti-forensics activity detection and prevention to safeguard the integrity of transactions and their associated log details using artificial intelligence and/or machine learning, ensuring that all transactions and logs within the system are complaint for cyber forensics, and making reactive forensic tasks more robust by adding proactive monitoring and compliance activity.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a cyber security process can monitor a plurality of incoming transaction requests from one or more streaming servers. An artificial-intelligence monitoring model can be trained to learn the touch points for the transaction requests. Component codes can be assigned for each of the transaction requests. Compliance hashes and validation hashes can be generated for the transaction requests. One or more alerts for data stored in different forms such as, for example, logs, raw data, structured data, etc. The artificial-intelligence monitoring model can be utilized to compare the compliance hashes with the validation hashes whenever the transaction requests attempt to alter or delete the data. One or more alerts can be generated if the transaction requests do not adhere to one or more governing rules, which can then revert back the transaction requests. Transaction requests can be allowed to proceed if they adhere to the governing rules.

In some arrangements, the plurality of transaction requests can be monitored from origination points to completion points. Additionally, in this process, unique identifiers such as global IDs may be used.

In some arrangements, transaction request denials and/or approvals can be generated by a compliance watcher depending on whether compliance hashes match validation hashes.

In some arrangements, compliance hash values and validation hash values can be calculated by addition of prior transaction evidence and current transaction evidence.

In some arrangements, step descriptions and component codes for transaction requests can be used to generate compliance hashes and validation hashes.

In some arrangements, a cyber security process can generate compliance hashes by monitoring a flow of transactions; generating a first hash for a first component in the transactions; generating a second hash for a second component in the transactions based on the second component and the first hash; generating a third hash for a third component in the transactions based on the third component and the second hash; generating a fourth hash for a fourth component in the transactions based on the fourth component and the third hash; designating the fourth hash as a compliance hash; updating a token table of compliance hash tokens with the compliance hash; storing the token table in a compliance database; storing component codes for the transactions in the compliance database; communicatively coupling the compliance database to the application database; and storing the transactions in the application database in order to implement the cyber security process.

In some arrangements, a cyber security process can validate compliance hashes by: monitoring a flow of transaction requests from one or more streaming servers; transmitting the transaction requests to a compliance watcher; utilizing the compliance watcher to determine whether to approve or deny the transaction requests based on whether hash tokens match; transmitting an update request status to approve or deny the transaction requests based on whether the hash tokens match; storing the transaction requests that are approved in an application database and a compliance database; and storing the hash tokens in the compliance database.

In some arrangements, a compliance watcher can utilize governing rules to determine whether to approve or deny transaction requests.

In some arrangements, hash tokens can comprise compliance hashes and validation hashes. And, in some arrangements, the hash tokens can comprise previous compliance and integrity tokens and current compliance and integrity tokens.

In some arrangements, previous compliance and integrity tokens can be generated based on step descriptions and component codes.

In some arrangements, current compliance and integrity tokens can be generated based on component codes and step descriptions.

In some arrangements, one or more various steps of discloses processes can be implemented in whole or in part as computer-executable instructions stored on computer-readable media.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 is a sample artificial-intelligence and/or machine learning flow diagram illustrating how to implement one or more cyber security aspects of this disclosure.

DETAILED DESCRIPTION

Figure 1:
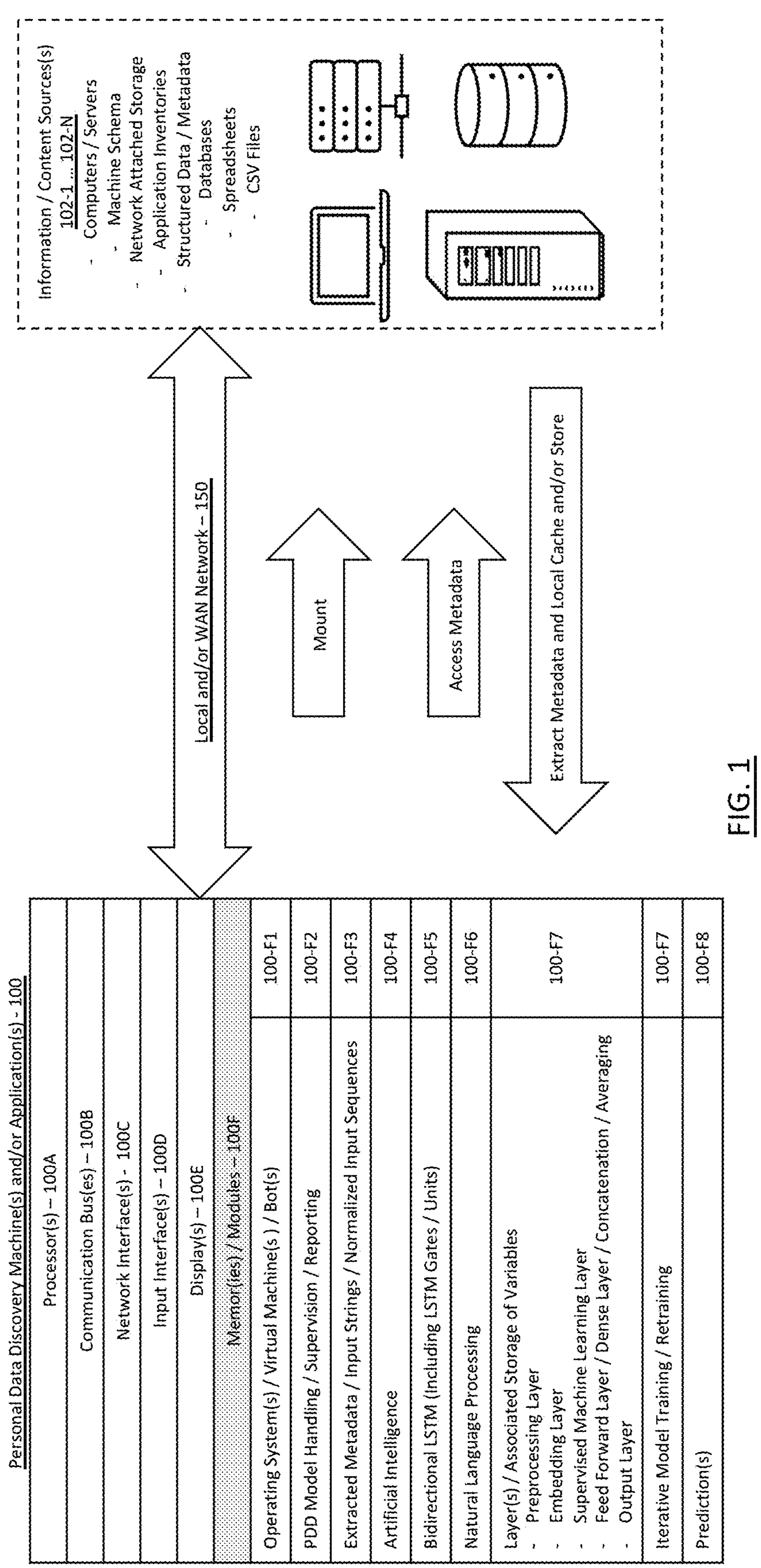
FIG. 1 depicts exemplary operating environment(s) and functionality for information security machines and processes to implement one or more cyber security aspects of this disclosure.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (e.g., 100, 102, 104, 180 . . . 180N, 190 . . . 190N etc.) can include one or more general-purpose, customized, configured, special-purpose, virtual, physical, and/or network-accessible devices such as: administrative computers, clients, clusters, compliance watchers, computing devices, computing platforms, controlled computers, controlled computers, controlling computers, desktop computers, distributed systems, enterprise computers, instances, laptop devices, monitors or monitoring systems, nodes, notebook computers, personal computers, portable electronic devices, servers, smart devices, streaming servers, tablets, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any particular type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc. (e.g., 100A, 102A, 104A, etc.), display(s) and/or input interfaces/devices (e.g., 100B, 102B, 104B, etc.), network interfaces, communication buses, or the like (e.g., 100C, 102C, 104C, etc.), and memories or the like (e.g., 100D, 102D, 104D, etc.), which can include various sectors, locations, structures, or other electrical elements or components. Other specific or general components, machines, or the like are not depicted in the interest of brevity and would be understood readily by a person of skill in the art. One or more sample(s) of the foregoing, some of which are expressly depicted, can be seen in FIG. 1 along with their associated components, subcomponents, related elements, sub-elements, etc.

As used throughout this disclosure, software, computer-executable instructions, data, modules, processes, routines, or the like can include one or more: active-learning, algorithms, alerts, applications, application program interfaces (APIs), artificial intelligence, attachments, big data, cryptography, cryptographic hashes, daemons, databases, datasets, drivers, data structures, emails, encryptions, file systems or distributed file systems, firmware, governance rules, graphical user interfaces, hashes, images, instructions, machine learning, middleware, modules, objects, operating systems, platforms, processes, protocols, programs, routines, scripts, tools, utilities, etc.

In the context of this disclosure, artificial intelligence deals with imparting the decisive ability and thinking ability to the cyber security machines. It is a blend of computer science, data analytics, and computer-implemented mathematics, and can include classification algorithms (e.g., Naive Bayes, Decision Tree, Random Forest, Support Vector Machines, K Nearest Neighbors, etc.), regression algorithms (e.g., Linear Regression, Lasso Regression, Logistic Regression, Multivariate Regression, Multiple Regression, etc.), clustering algorithms (e.g., K-Means Clustering, Fuzzy C-mean, Expectation-Maximisation, Hierarchical Clustering, etc.), etc. Machine learning in the context of this disclosure is closely related and may be considered in some instances to overlap with artificial intelligence wholly or partially. In the context of this disclosure, machine learning can be supervised, semi-supervised, reinforcement, and/or unsupervised learning. Sample algorithms can include bidirectional LSTM, Logistic Regression, XG Boost, Random Forest, etc. Natural language processing may also be utilized if desired.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Examples can be seen in FIG. 1 as memor(ies)/module(s) 100D, 102D, 104D along with samples of the foregoing generically represented, in one instance for illustrative purposes, as any number of components, modules or the like such as element—100-D1, element—100-D2, element—100-D3, element—100-D4, element—100-D5, . . . element—100-DN in one or more sectors, locations, components, etc. Some or all the foregoing may additionally and/or alternatively be stored similarly and/or in a distributed manner in compliance database 110, application database 112, governance rules 114, and/or network accessible storage/distributed data/datastores/databases/big data etc. 170.

Sample local and/or distributed memory (or the like) contents in accordance with the foregoing may include, as shown in sample structure 106, software, computer-executable instructions, data, modules, process, routines or the like, such as: Application Module(s), Approval(s), Compliance and Integrity Tokens (Current), Compliance and Integrity Tokens (Previous), Compliance Hash Token(s), Compliance Hash(es), Compliance Module(s), Compliance Watcher Module(s), Component Code(s), Component(s), Current Event Evidence (Current Hash), Denial(s), Event(s), Global Session ID, Governance Module(s), Hash Calculation Module(s), Hash(es), Identifier(s) or IDs, Logs, Previous Transaction Path Evidence (Previous Hash Value), Raw Data, Request(s), Step Descriptor(s), Structured or Unstructured Data, Token Table(s), Token(s), Transactions, etc.

The foregoing software, computer-executable instructions, data, modules, processes, routines, or the like, when executed-individually and/or collectively across-one or more various computers, machines, or the like (or any components therein) may cause ASICs, processor(s), core (s), executor(s), etc. to perform one or more artificial intelligence, machine learning and/or other above-referenced functions relevant to cyber security and/or may store or otherwise maintain information that may be used in one or more aspects of this disclosure.

As used throughout this disclosure, computer "networks," topologies, or the like (e.g., 160, etc.) can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTP or any other type of suitable communication, transmission, and/or other packet-based protocol. One or more sample(s) of the foregoing, some of which are expressly depicted, can be seen in FIG. 1 along with their associated components, subcomponents, related elements, sub-elements, etc.

Accordingly, and as described briefly above, a skilled artisan will understand that FIG. 1 depicts exemplary operating environment(s) and functionality for information security machines and processes to implement one or more cyber security aspects of this disclosure.

By way of non-limited reference and explanation, a generic, sample, implementation of an artificial intelligence, machine-learning, and/or the like flow diagram is depicted in FIG. 2 to show how to implement one or more cyber security aspects of this disclosure. Incoming requests in a steaming server may be monitored in S200. One or more transaction(s) can be monitored from an origination point to completion by using a unique identifier or the like such as a Global Session ID in S202. The model may be trained to learn what should be the touch points for each kind of transaction in S204. Component codes can be assigned and used to build a monitoring hash at each step for every transaction in S206. An alert and monitoring system can be implemented for the data stored in different forms such as logs, raw data, and structured data in S208. Whenever a transaction or log is altered or deleted, the monitoring model can compare with an integrity and compliance hash value as in S210. If the transaction change does not adhere to the governing rules, an alert can be triggered and the activity may be reverted back in S212.

As used herein, a hash is a function that converts one value to another. Hashing data is a common practice in computer science and is used for several different purposes. Examples include cryptography, compression, checksum generation, and data indexing. Hashing is a natural fit for cryptography and cyber security because it masks the original data with another value. A hash function can be used to generate a value that can only be decoded by looking up the value from a hash table. The table may be an array, database, or other data structure. A good cryptographic hash function is non-invertible, meaning it cannot be reverse engineered.

Hashes are also used to generate checksums, which are used to ensure that files are not corrupted. Typically, checksums are small values generated based on the bits in a file or block of data, such as a disk image, and used to verify that the data is correct. Checksum functions on copies of files (such as those downloaded from the Internet) should produce hashed values that are the same as those produced by the original file when the function is run. If the file does not produce the same checksum as before, this indicates that something in the file has been changed.

Lastly, hashes are used to organize and index data. Data can be mapped to individual "buckets" within a hash table using hashing values, which are stored in a database. Each bucket is identified by a unique ID, which serves as a pointer to the underlying data. This results in an index that is significantly smaller than the original data, allowing for more efficient searching and accessing of the values. All types of hashes and the like are considered to be within the spirit and scope of this disclosure.

Figure 3:
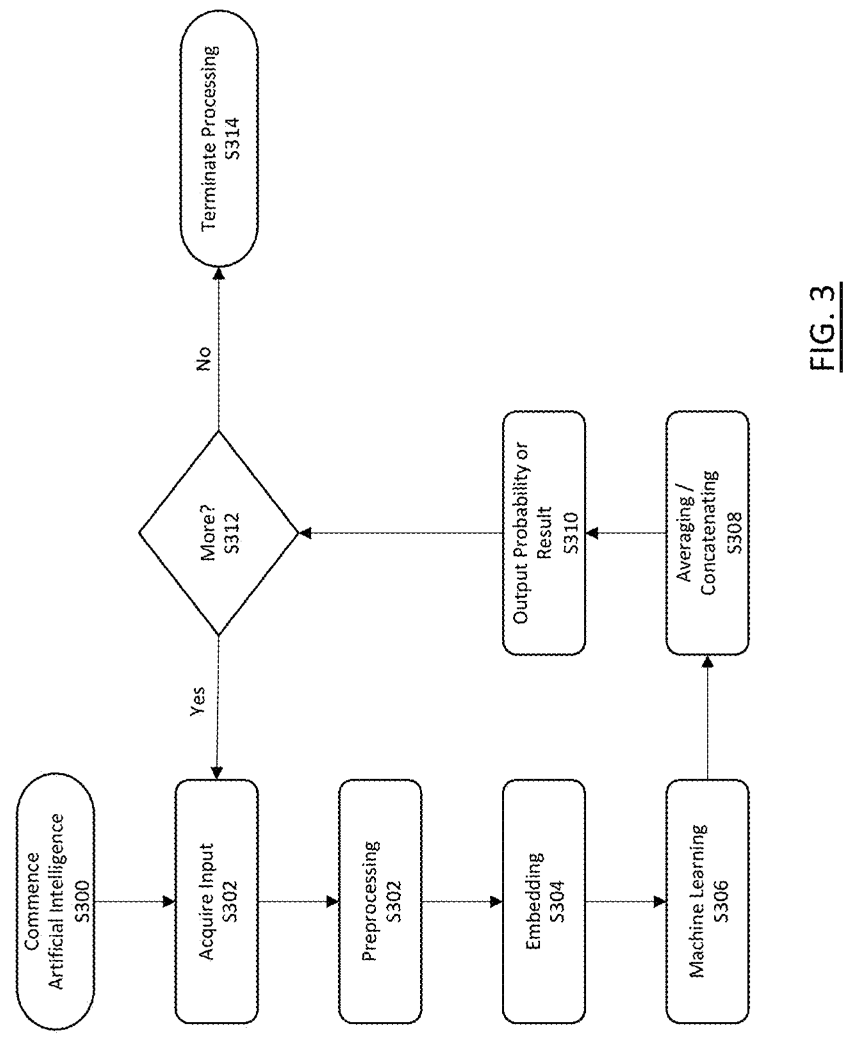
FIG. 3 illustrates how compliance hashes may be generated in accordance with one or more cyber security aspects of this disclosure.

FIG. 3 illustrates how compliance hashes may be generated in accordance with one or more cyber security aspects of this disclosure. Processes may have a flow to their transactions 300. For example, components 1 through N (e.g., Component-1 301, Component-2 302, Component-3 303, Component-4 304 . . . . Component-N) may be executed in series or in parallel. As executed, the components may be stored in application database 112. Alternatively, the components may be extracted from the application database 112 in order to be executed as part of transaction flow 300. After each component is executed, a corresponding hash can be created. For example, after Component-1 301 is executed, a corresponding Hash-1 311 may be created. Similar hashes of 311, 312, 313, 314, etc. can be created after execution of each of corresponding Components-1 through Components-N. Each hash can be used as an input to the next component or hash calculation in order to result in a compliance hash. The compliance hash can then be used to update a token table and stored in a structure containing compliance hash tokens 320. The compliance hash tokens can be stored in and/or loaded from a compliance database 110 and can also be output for storage as compliance codes 322.

Figure 4:
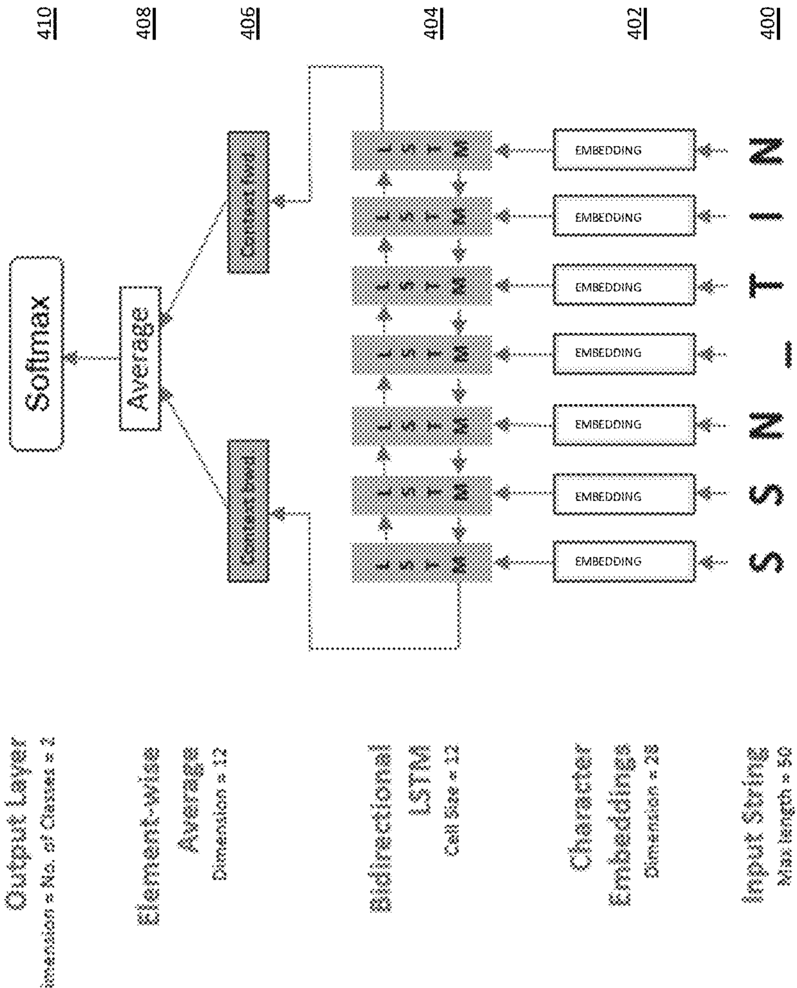
FIG. 4 illustrates a sample calculation process for compliance hashes in accordance with one or more cyber security aspects of this disclosure.

FIG. 4 illustrates a sample calculation process for compliance hashes in accordance with one or more cyber security aspects of this disclosure. The hash calculation process can be implemented in step S400. The previous transaction evidence (previous hash value) can be loaded into memory in S402. The current evidence can be calculated (i.e., current hash value) in S404. The prior and current hash values can be summed in S406 and the result can be stored for future reference and use in S408. If further hash calculations are required S410, the process may be repeated in S400 or the process can be terminated in S412.

Figure 5:
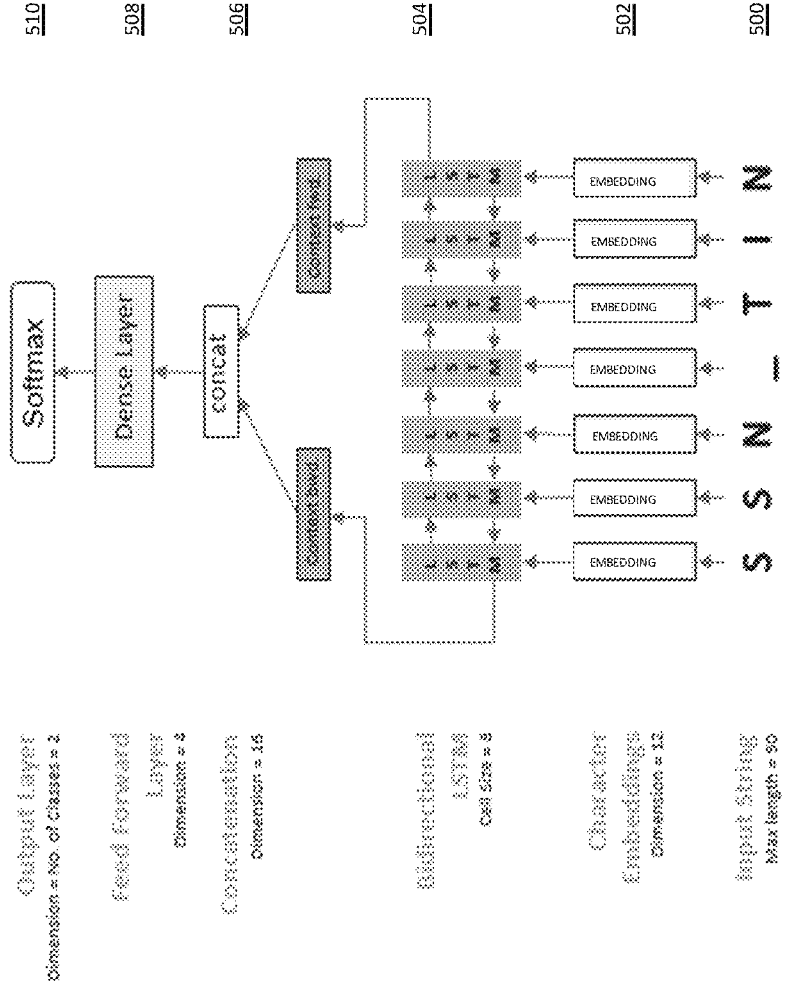
FIG. 5 shows sample generation of compliance hashes in accordance with one or more cyber security aspects of this disclosure.

FIG. 5 shows a sample generation of compliance hashes in accordance with one or more cyber security aspects of this disclosure. In this particular example, a high-level summary of potential steps that may be involved in a currency transfer process is illustrated. For example, the process may start by authenticating a user, requesting a transfer, scheduling the transfer, entering details about the transfer, reviewing the transfer details, confirming the transfer was successful, and then reporting that the transfer was successful and complete. The present disclosure may be utilized in accordance with any series of transactions and is not limited to this financial transfer example.

In general, the process can be considered with respect to four (or more or less) separate linear implementations: a series of step descriptions or other general identifiers 500, corresponding component codes 502 for the step descriptors or descriptions, previous compliance and integrity tokens in the form a previous hash value 504, and resulting current compliance and integrity tokens in the form of current hash values 506.

In short, a step description 500 can be used in conjunction with a component code 502 and a previous compliance and integrity token (prior hash value) 504 to generate a current compliance and integrity token (current hash value) as part of the overall process 506. Some or all of these may be stored for future cyber security use or validation purposes.

Figure 6:
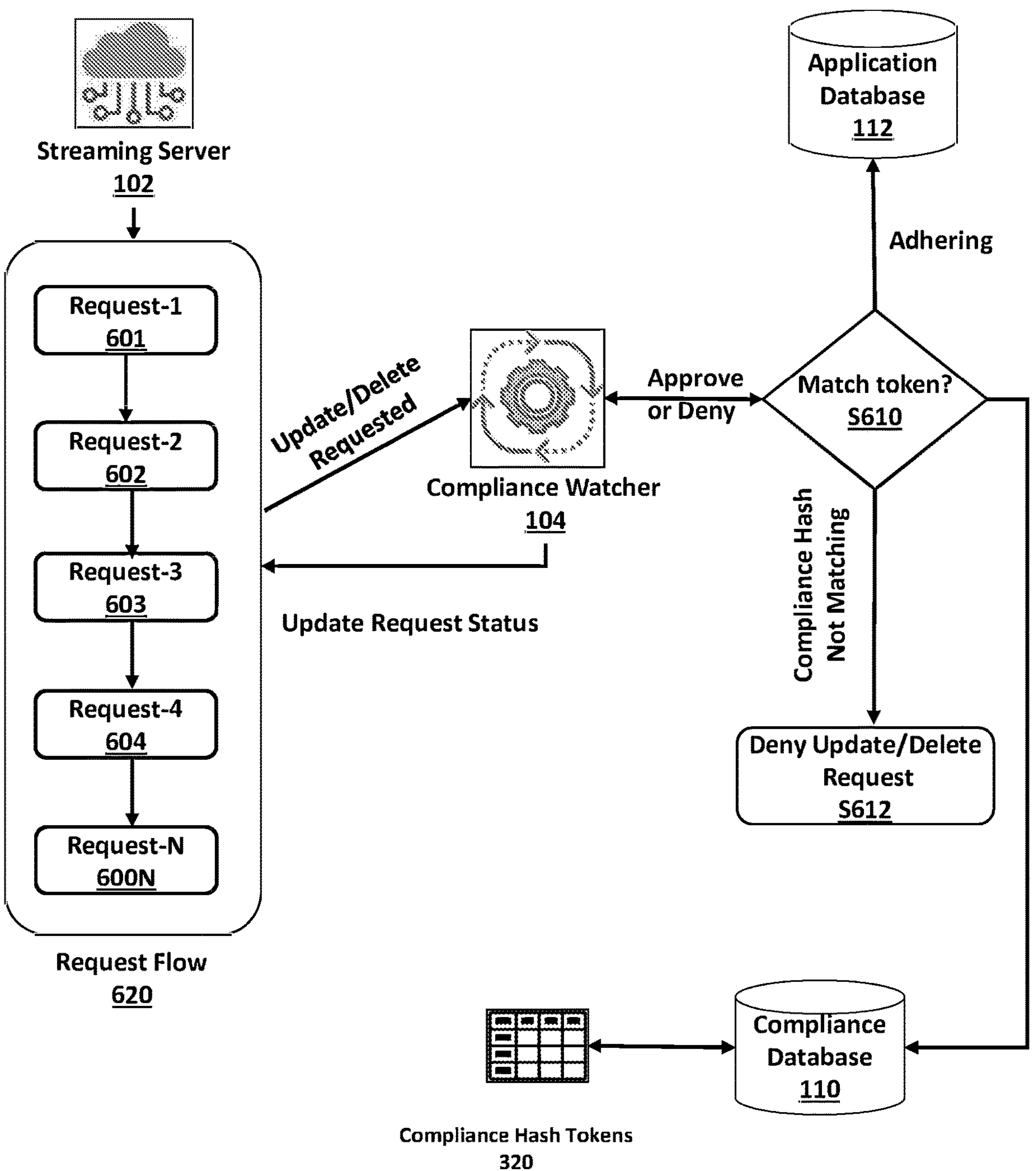
FIG. 6 illustrates how compliance hashes may be validated in accordance with one or more cyber security aspects of this disclosure.

FIG. 6 shows how compliance hashes may be validated in accordance with one or more cyber security aspects of this disclosure, a series of requests (Request-1 601, Request-2 602, Request-3 603, Request-4, 604 . . . . Request-N 600N) may issue from one or more streaming server(s) 102. For one or more requests, information may be transmitted regarding the request to a compliance watcher 104 to determine whether to perform an update or delete a transaction or event such as, for example, in a log. If the request is in compliance with governing rules (i.e., the tokens match) S610, the adhering request may be updated in the application database 112. Otherwise, if the compliance hash does not match, the update/delete request (for example a request to update or delete a log entry) may be denied S612. Approvals or denials of requests may be communicated by the compliance watcher 104 to update the request status in the request flow 620 or for individual requests 601, 602, 603, 604 . . . 600N. Information regarding whether a token matches in accordance with the governing rules may also be communicated to a compliance database 100 which can then store and/or retrieve compliance hash tokens for future use as party of a cybersecurity process.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A cyber security process for proactive anti cyber-forensic activity detection and prevention that validates compliance hashes comprising the steps of:

a. monitoring a flow of transaction requests from one or more streaming servers using a global session identifier to track each of said transaction requests from an origination point to a completion point;

b. transmitting each of said transaction requests to a compliance watcher;

c. utilizing an artificial-intelligence monitoring model trained to learn touch points for each kind of said transaction requests and the compliance watcher to determine whether to approve or deny each of said transaction requests based on whether hash tokens match, wherein said hash tokens comprise previous compliance and integrity tokens and current compliance and integrity tokens generated based on step descriptions and component codes, and wherein the current compliance and integrity tokens are generated by incorporating the previous compliance and integrity token with the current component code and step description to form a chained hash;

d. transmitting an update request status to approve or deny each of said transaction requests based on whether said hash tokens match;

e. storing each of said transaction requests that are approved in an application database and a compliance database; and f. storing the hash tokens in the compliance database to proactively preserve forensic evidence against tampering or concealment.

2. The cyber security process of claim 1 in which the compliance watcher utilizes governing rules to determine whether to approve or deny each of said transaction requests.

3. The cyber security process of claim 2 in which the hash tokens comprise compliance hashes and validation hashes.

4. The cyber security process of claim 3 in which the hash tokens comprise previous compliance and integrity tokens and current compliance and integrity tokens.

5. The cyber security process of claim 4 in which the previous compliance and integrity tokens are generated based on step descriptions and component codes.

6. The cyber security process of claim 5 in which the current compliance and integrity tokens are generated based on the component codes and the step descriptions.

7. The cyber security process of claim 6 in which the steps are implemented as computer-executable instructions stored on computer-readable media.

* * * * *